United States Patent
Kalbacher (10) Patent No.: US 6,543,525 B2
(45) Date of Patent: Apr. 8, 2003

(54) COOLING UNIT FOR USE WITH A COOLING SYSTEM OF INTERNAL COMBUSTION ENGINES

(75) Inventor: Klaus Kalbacher, Rangendingen (DE)

(73) Assignee: Modine Manufacturing Company, Racine, WI (US)

(*) Notice: Subject to any disclaimer, the term of this patent is extended or adjusted under 35 U.S.C. 154(b) by 0 days.

(21) Appl. No.: 09/891,982

(22) Filed: Jun. 10, 2001

(65) Prior Publication Data

US 2001/0054497 A1 Dec. 27, 2001

(30) Foreign Application Priority Data

Jun. 21, 2000 (DE) .......................................... 100 30 355

(51) Int. Cl.[7] .............................. F28D 7/10; F28D 1/00; B60K 11/00; B60K 11/04
(52) U.S. Cl. ...................... 165/140; 165/149; 180/68.1; 180/68.4
(58) Field of Search .......................... 165/140, 67, 149; 180/68.1, 68.4

(56) References Cited

U.S. PATENT DOCUMENTS

| | | | |
|---|---|---|---|
| 4,566,407 A | * 1/1986 | Peter ...................... | 123/41.48 |
| 4,604,974 A | * 8/1986 | Watanabe ................. | 123/41.57 |
| 4,757,858 A | * 7/1988 | Miller et al. ............. | 180/68.4 |
| 5,046,554 A | * 9/1991 | Iwasaki et al. ............ | 165/140 |
| 5,269,367 A | * 12/1993 | Susa et al. ................. | 165/67 |
| 5,460,485 A | * 10/1995 | Sugiyama et al. ........ | 415/208.2 |
| 5,526,872 A | * 6/1996 | Gielda et al. .............. | 165/41 |

FOREIGN PATENT DOCUMENTS

DE          4437946          12/1999

* cited by examiner

Primary Examiner—Henry Bennett
Assistant Examiner—Tho V Duong
(74) Attorney, Agent, or Firm—Wood, Phillips, Katz, Clark & Mortimer (57) ABSTRACT

A cooling unit is provided for use with a cooling system of an internal combustion engine. The cooling system includes an air-cooled radiator to reject heat from a coolant of the internal combustion engine. The cooling unit comprises an air-cooled heat exchanger to reject heat from another medium to an air flow, an air receiver and at least one releasable clamp. The heat exchanger includes an inlet for the air flow, an outlet for the air flow, and an outer perimeter extending between the inlet and the outlet. The air receiver is connectable to the radiator and surrounds the outer perimeter of the heat exchanger. The air receiver includes an inlet end for the air flow, an outlet end for the air flow, and an air duct extending between the inlet end and the outlet end to direct the air flow from the outlet of the heat exchanger to the outlet end of the air receiver. The inlet end and the inlet are substantially coplanar. The clamp is engaged with the air receiver to tighten the air receiver against the heat exchanger.

24 Claims, 6 Drawing Sheets

COOLING UNIT FOR USE WITH A COOLING SYSTEM OF INTERNAL COMBUSTION ENGINES

FIELD OF THE INVENTION

This invention relates to cooling units for use with cooling system heat exchangers of internal combustion engines, and more particularly to cooling units that as include air ducts for directing air flows from heat exchangers of the cooling units.

BACKGROUND OF THE INVENTION

Cooling systems are known that employ a plurality of heat exchangers to reject heat from various other systems of an internal combustion engine and/or a vehicle carrying the internal combustion engine. For example, such cooling systems may include an air radiator for rejecting heat from the engine coolant, a charge air-cooled cooler, and/or an oil cooler. Some of these cooling systems employ an auxiliary heat exchanger, such as an oil cooler, and a separate air duct that directs the air flow for the oil cooler, with special mounting brackets or fasteners for each of the auxiliary heat exchanger and the air duct to mount the components relative to the internal combustion engine. One such system is shown in DE 44 37 946 C2.

While such known cooling systems may perform acceptably for their intended purpose, there is always room for improvement. For example, in the internal combustion engine and vehicle industry, there is a continuing desire to make such systems more compact and/or lighter in weight and/or less expensively and/or easier to assemble.

SUMMARY OF THE INVENTION

In accordance with the invention a cooling unit is provided for use with a cooling system of an internal combustion engine. The cooling system includes a first air-cooled heat exchanger to reject heat from a first medium, such as an air-cooled radiator that rejects heat from a coolant of the internal combustion engine. The cooling unit includes a second air-cooled heat exchanger to reject heat from another medium to an air flow, an air receiver, and at least one releasable clamp to tighten the air receiver against the second heat exchanger. The second heat exchanger includes an inlet for the air flow, an outlet for the air flow, and an outer perimeter extending between the inlet and the outlet. The air receiver is connectable to the first heat exchanger and surrounds the outer perimeter of the second heat exchanger. The air receiver includes an inlet end for the air flow, an outlet end for the air flow, and an air duct extending between the inlet end and the outlet end to direct the air flow from the outlet of the second heat exchanger to the outlet end of the air receiver. The inlet end and the inlet are substantially coplanar.

In one embodiment, the air receiver includes a first wall extending from the inlet end to the outlet end, and a second wall extending from the inlet end to the outlet end opposite to the first wall. Preferably, a part of one of the first and second walls proximate to the outlet end is angled toward the other wall to direct the air flow.

In one embodiment, the clamp includes a tension member including a first end engaged with the first wall proximate to the inlet end, a second end engaged with the second wall proximate to the inlet end, and an elongated part extending from the first end to the second end.

In one form, the first end of the tension member includes a bracket and the air receiver includes a catch extending away from the first wall proximate to the inlet end. The bracket extends from the elongated part to rest on the first wall and has an opening to receive the catch.

In one form the second end of the tension member includes a foot part, and the air receiver includes a socket on the second wall proximate to the inlet end. The foot part is connected with the elongated part and engaged in the socket to restrict torsional movement of the foot part relative to the air receiver.

In one embodiment, the clamp includes a tighten member extending through the socket and engaged with the tension member to tighten the first wall and the second wall against the second heat exchanger.

In one embodiment, the air receiver further includes a plurality of spaced support ribs on an exterior side of at least one of the first and second walls. Each rib extends from the inlet end toward the outlet end.

In one form, the air receiver includes a plurality of spaced support ribs connecting the first wall to the second wall. The ribs extend between the outlet of the second heat exchanger and the outlet end of the air receiver.

DESCRIPTION OF THE PREFERRED EMBODIMENTS

Figure 1:
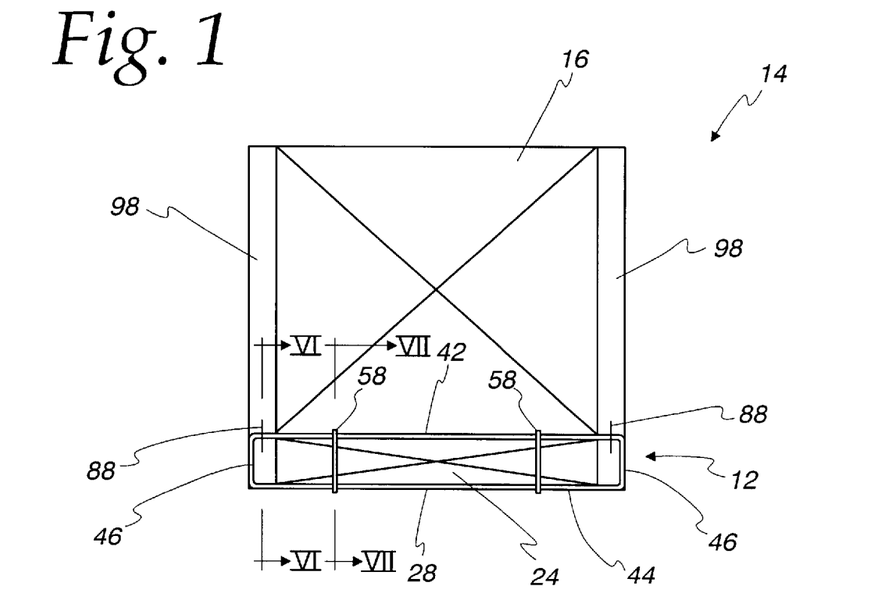
FIG. 1 is a diagrammatic front view of a cooling system for an internal combustion engine including a cooling unit in accordance with one embodiment of the invention.
Figure 2:
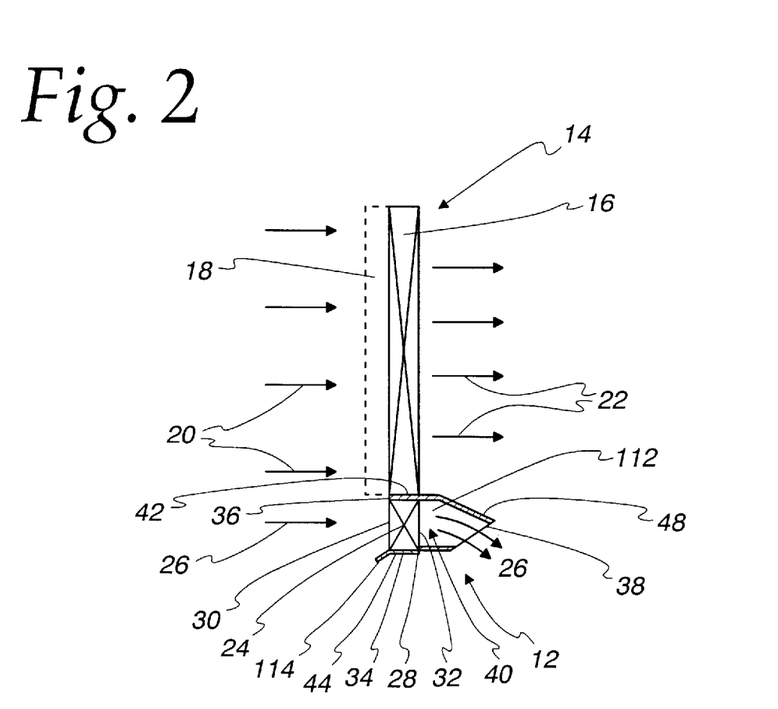
FIG. 2 is a diagrammatic, partially sectional side view of the cooling system of FIG. 1.
Figure 3:
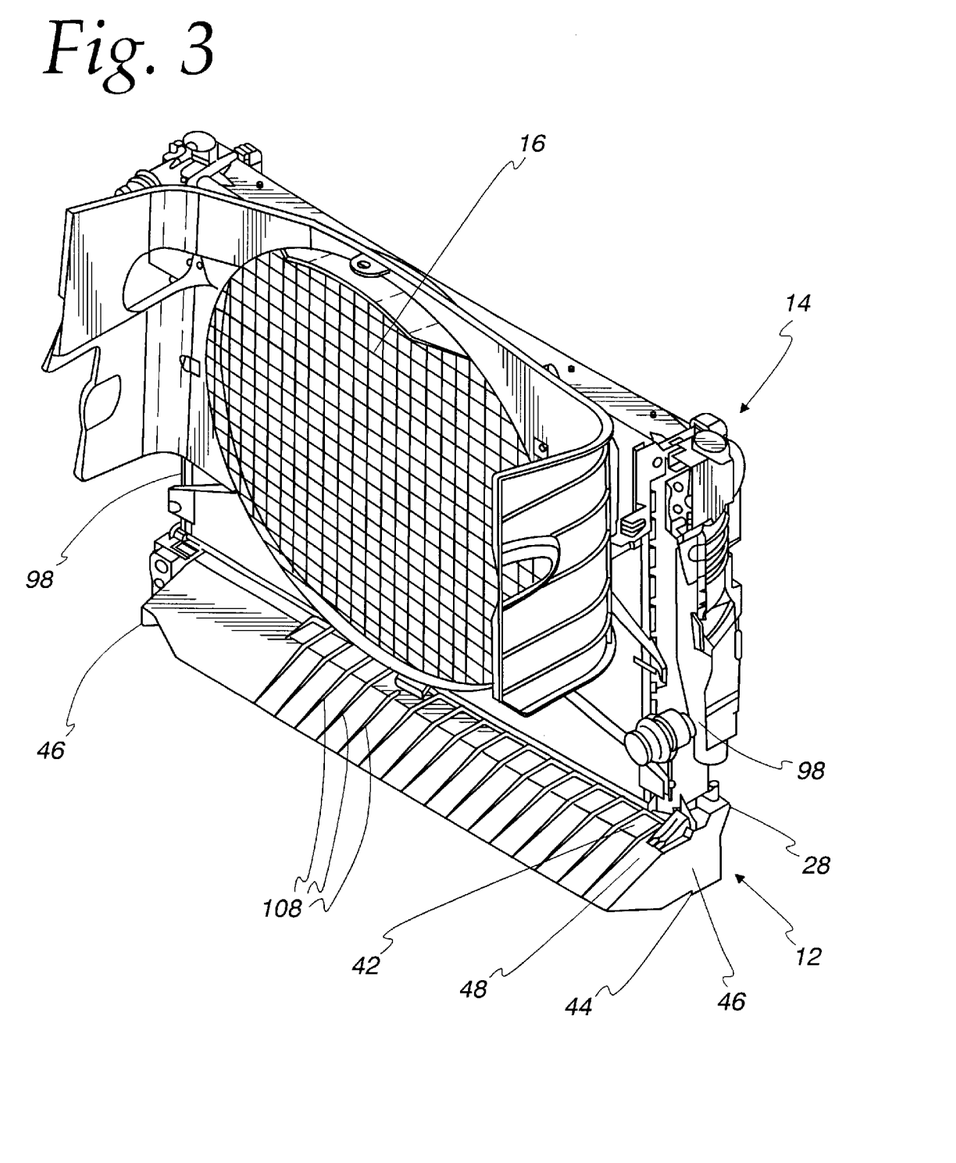
FIG. 3 is a perspective view of a back side of the cooling system of FIG. 1.

A cooling unit 12 for use with a cooling system 14 of an internal combustion engine (not shown) is illustrated in FIGS. 1–8, and can include several heat exchangers for cooling various fluids used in the operation of the engine and/or a vehicle in which the engine is mounted. The cooling system 14 includes an air-cooled radiator 16 to reject heat from a coolant of the internal combustion engine. Referring to FIG. 2, a charge air cooler 18 (shown with a dashed line) can be connected in front of the radiator 16. An air flowing against the front side of the cooling system 14 is indicated with arrows 20, while the air that has passed through the cooling system 14 and flows off behind it is indicated with arrows 22.

The cooling unit 12 includes an air-cooled heat exchanger 24 to reject heat from another medium, such as engine oil, transmission oil or the like, to an air flow indicated by arrows 26. The cooling unit 12 also includes an air receiver 28 connected to the radiator 16 and surrounding the heat exchanger 24. In the illustrated embodiment, the cooling unit 12 is arranged beneath the radiator 16. However, it should be understood that the cooling unit 12 can be arranged on other sides of the radiator 16. Preferably, the heat exchanger 24 received in the air receiver 28 is arranged between the planes defined by the front and back faces of the radiator 16. The heat exchanger 24 includes an inlet 30 for receiving the air flow 26, an outlet 32 for discharging the air flow 26, and an outer perimeter 34 extending between the inlet 30 and the outlet 32.

The air receiver 28 surrounds the outer perimeter 34 of the heat exchanger 24 and includes an inlet end 36 for receiving the air flow 26, an outlet end 38 for discharging the air flow 26, and an air duct 40 extending between the inlet end 36 and the outlet end 38 to direct the air flow 26 from the outlet 32 of the heat exchangers 24 to the outlet end 38 of the air receiver 28. The inlet end 36 and the inlet 30 are substantially to coplanar. In the illustrated embodiment, the air receiver 28 is substantially rectangular to conform with the rectangular shape of the heat exchanger 24. Preferably, the air receiver 28 is a unitary molded component, such as, for example, a molded plastic component.

Figure 4:
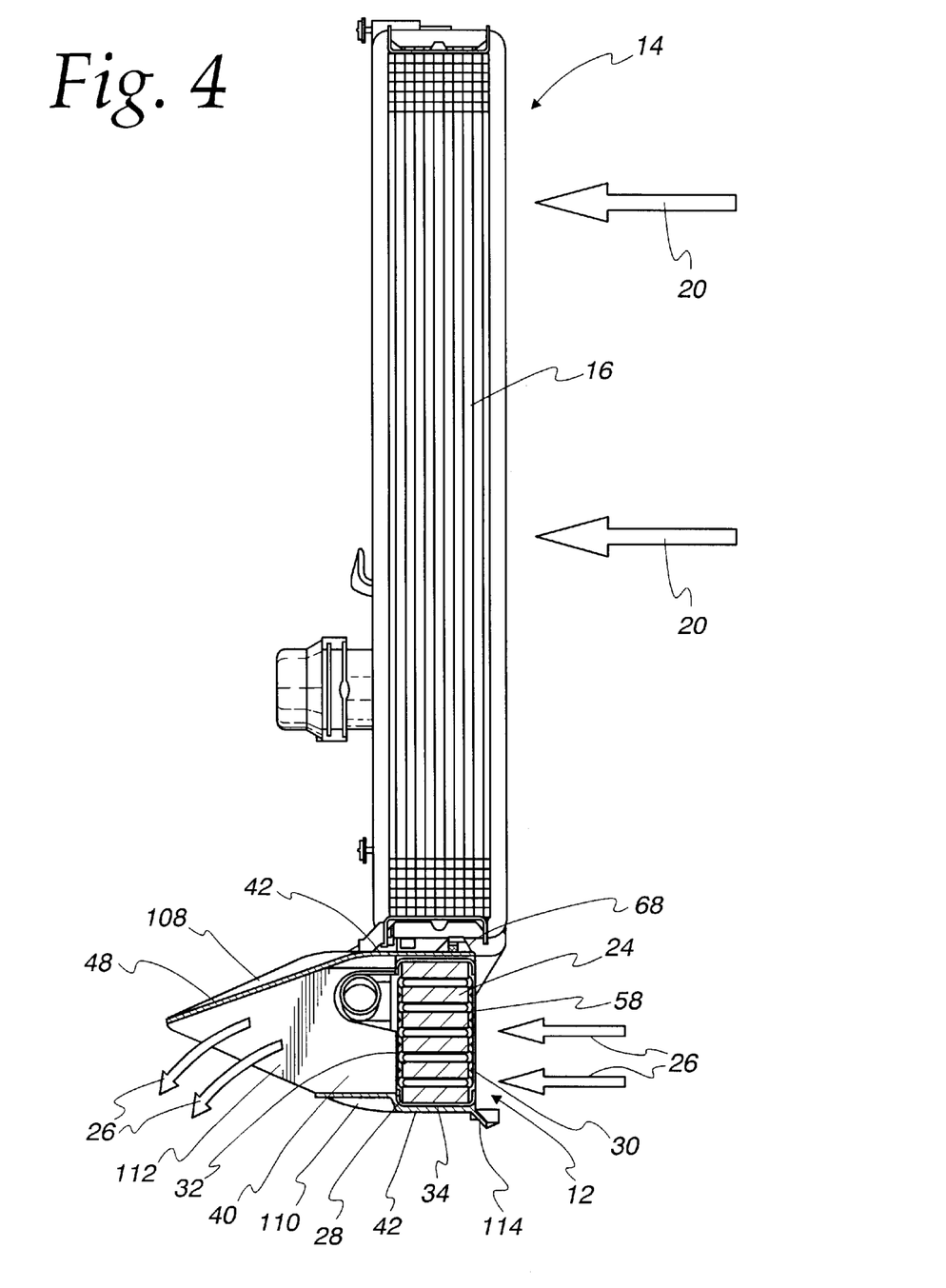
FIG. 4 is a partially sectional side view of the cooling system of FIG. 1.
Figure 6:
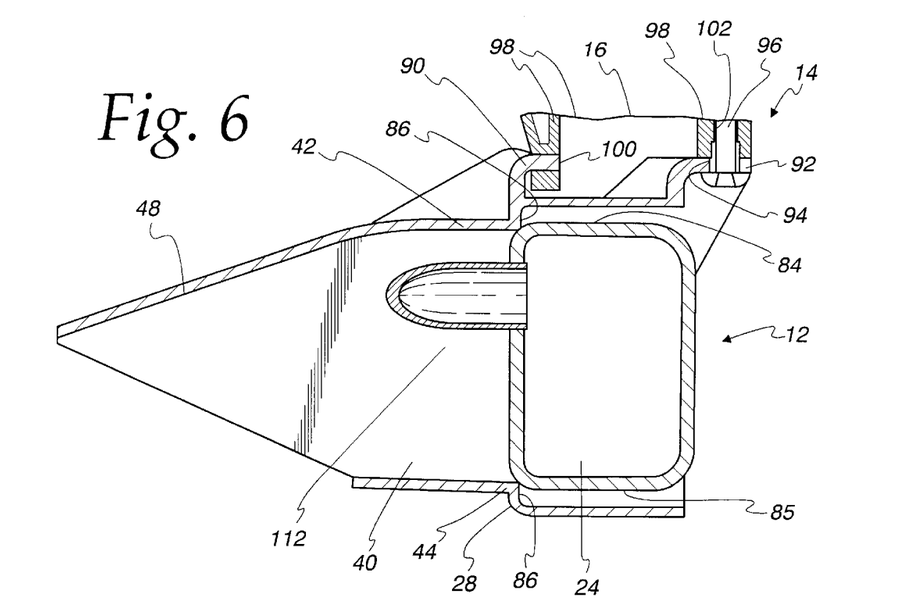
FIG. 6 is a sectional view taken along line VI—VI of FIG. 1.
Figure 7:
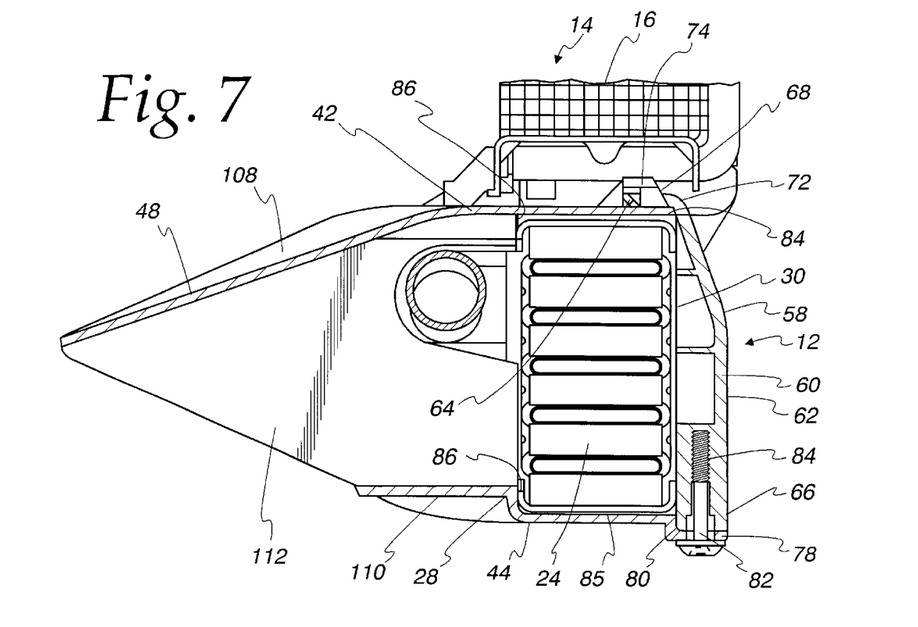
FIG. 7 is a sectional view taken along line VII—VII of FIG. 1.

Referring to FIGS. 4, 6 and 7, the air receiver 28 includes a top wall 42 extending from the inlet end 36 to the outlet end 38, a bottom wall 44 extending from the inlet end 36 to the outlet end 38 opposite to the top wall 42, and two side walls 46. The side walls 46 are spaced opposite to each other, extend from the inlet end 36 to the outlet end 38, and are bordered by the top and bottom walls 42 and 44. In the illustrated embodiment, an angled part 48 of the top wall 42 proximate to the outlet end 38 is angled toward the bottom wall 42 to direct the air flow 26 in a downward direction. Preferably, the walls 42, 44, and 46 of the air receiver are thin-walled, and in one embodiment each of the walls 42, 44 and 46 has a cross sectional thickness between about 2 and 3 mm.

Figure 8:
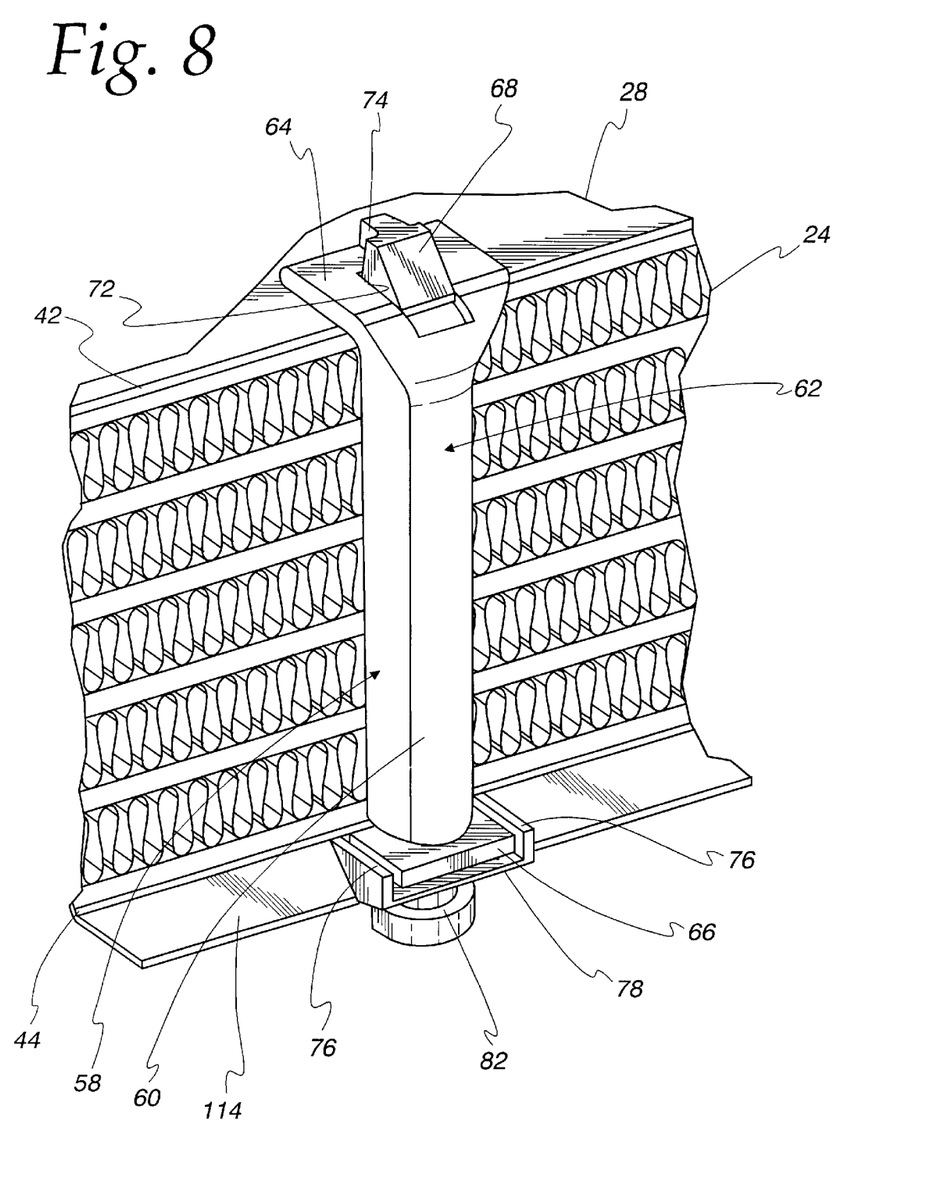
FIG. 8 is an enlarged, partial perspective view of showing a clamp of the cooling unit of FIG. 1.

As best seen in FIGS. 1, 7 and 8, the cooling unit 12 includes two clamps 58 situated on both sides of the air receiver 28 and proximate to the inlet end 36. The clamps 58 can generally be formed from clips, anchors, hooks, eyes or similar locking elements to tighten the air receiver 28 to the heat exchanger 24. In accordance with one embodiment of the invention, each of the clamps 58 is identical in construction. Referring to FIGS. 7 and 8, the clamp 58 includes a tension member 60 including an elongated part 62, a bracket 64 extending from one side of the elongated part 62 and a foot part 66 connected with the elongated part 62 opposite to the bracket 64. Preferably the tension member 60 is a unitary construction. The air receiver 28 includes a catch 68 extending away from the top walls 42 proximate to the inlet end 36, and a socket 70 on add the bottom wall 44 proximate to the inlet end 36. The bracket 64 has an opening 72 that is square in the illustrated embodiment. Preferably, the opening 72 and the catch 68 have mating shapes. The catch 68 is engaged in the opening 72 of the bracket 64, and preferably further includes a stop 74 extending from the catch 68 overlying the bracket 64 to restrict movement of the bracket 64 away from the air receiver 28. The foot part 66 and the socket 70 have mating polygonal shapes, for example, squares. In the illustrated embodiment, the socket 70 is generally U-shaped and includes two spaced side jaws 76 extending from the air receiver 28 at the inlet end 36 and a base wall 78 between the side jaws 76. The foot part 66 rests between the side jaws 76 which restrict torsional movement of the foot part 66 relative to the air receiver 28.

As best seen in FIG. 7, the base wall 78 of the U-shaped socket 70 has an hole 80 that can be traversed by a tightening member 82 such as a screw or the like. The tension member 60 has in its lower part a hole 83 downward for engagement of the tightening member 82. The tightening member 82 can be a self-tapping sheet metal screw. When the tightening member 82 is tightened, both the top and bottom walls 42 and 44 of the air receiver 28 are tightened together in the vertical direction against a top 84 and bottom 85 of the outer perimeter 34 of the heat exchanger 24.

The inlet 30 is spaced from the outlet 32 by a width of the heat exchanger 24. Referring to FIGS. 6 and 7, each of the top and bottom walls 42 and 44 includes a shoulder 86 spaced inward from the inlet end 36 of the air receiver 28 by a distance that approximates the width of the heat exchanger 24. With the clamp 38 engaged with the air receiver 28 according to FIG. 7, the elongated part 62 of the tension member 60 is abutted against the inlet 30 of the heat exchanger 24 to retain the heat exchanger 24 against the shoulders 86 of the top and bottom walls 42 and 44.

Two fastening devices 88 are provided on both ends of the air receiver 28 and are shows diagrammatically in FIG. 1. Referring to FIG. 6, each fastening device 88 include a hook 90 extending from the air receiver 28, and a mounting bracket 92 extending from the air receiver 28 with a hole 94 passing through the bracket 92. Preferably, the hooks 90 and the mounting brackets 92 are molded onto the air receiver 28. The fastening device 88 also has a fastener 96 such as a screw or a mounting bolt, for example, a self-tapping screw, passing through the hole 94 in the mounting bracket 92. The radiator 16, and preferably each of the collecting tanks 98 of the radiator 16, has corresponding mounts 100 and 102 for these fastening devices 88. Each mount 100 allocated to the corresponding hook 90 includes a corresponding opening 104 to receive the hook 90, while each mount 102 allocated to the corresponding fastener 96 has an opening 106 for the fastener 96. In one embodiment, these mounts 100 and 102 are molded onto the collecting tanks 98 of the radiator 16. Preferably the mounts 100 and 102 are made of plastic.

Figure 5:
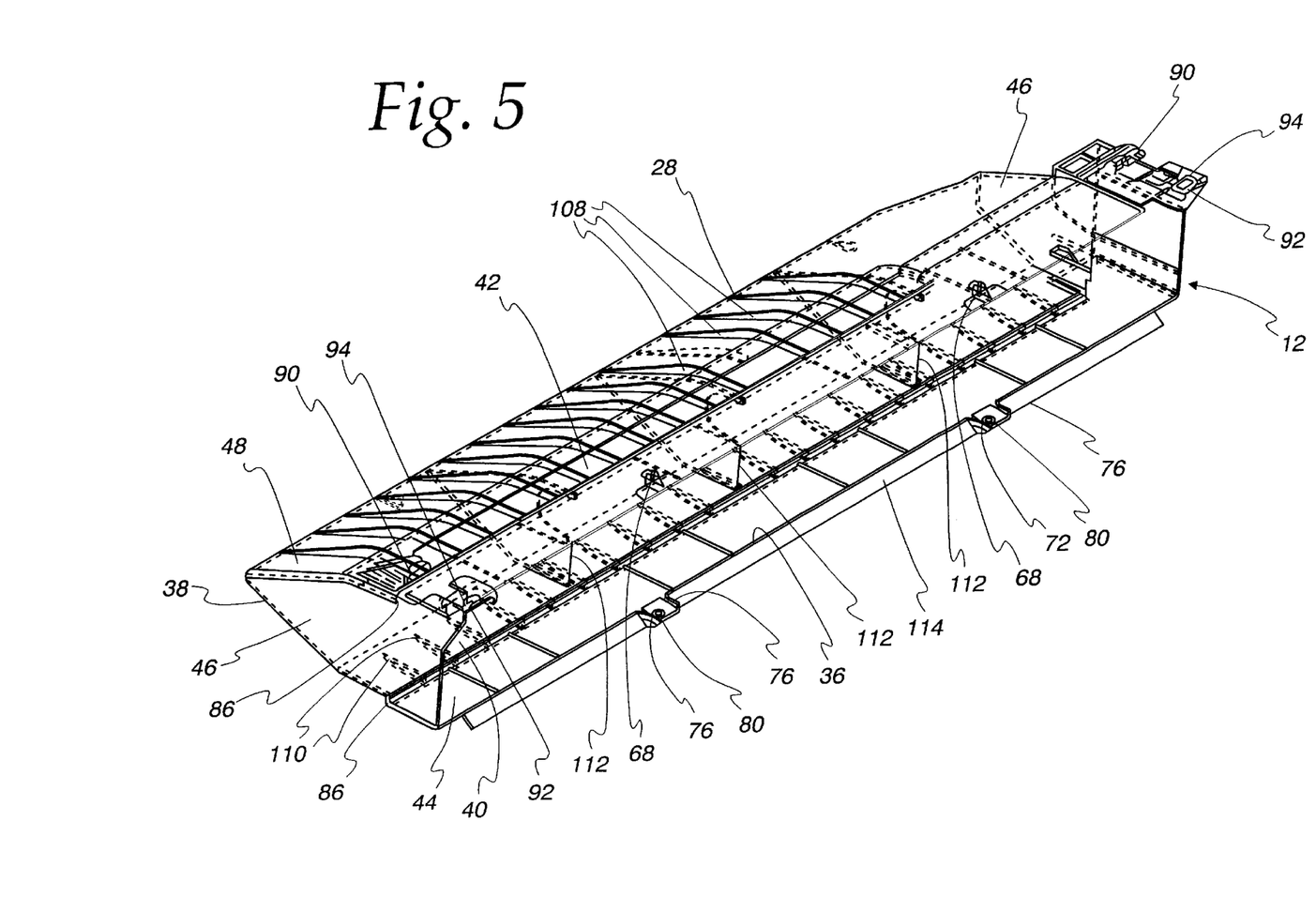
FIG. 5 is a perspective view of an air receiver of the cooling unit of FIG. 1.

Referring to FIG. 5, there are a plurality of spaced support ribs 108 and 110 on exterior sides of the top and bottom walls 42 and 44. Each of the ribs 108 and 110 extends from the inlet end 36 toward the outlet end 38. A plurality of spaced support rids 112 connect the top wall 42 to the bottom wall 44 as best seen in FIGS. 2, 4, 6 and 7. The ribs 112 extend between the outlet 32 of the heat exchanger 24 and the outlet end 38 of the air receiver 28. Preferably, the support ribs 108, 110 and 112 are molded as unitary members of the air receiver 28. As shown in FIGS. 2, 4 and 5, the air receiver 28 can include a guide vane 114 extending forward and downward from the air receiver 28, preferably from an edge of the bottom wall 44, at the inlet end 36 to direct the air flow 26 into the inlet 30 of the heat exchanger 24. The guide vane 114 extends substantially the width of the air receiver 28, and can be formed arc-like or in other shapes adapted to guide the air flow 26 for better inflow and avoidance of any turbulence.

From the foregoing, the clamps 58 engage the top and bottom walls 42 and 44 of the air receiver 28 and tighten them to the top 84 and bottom 85 of the heat exchanger 24, so that the air receiver 28, especially its top and bottom walls 42 and 44, is stiffened by means of the heat exchanger 24 which ordinarily consists of metal component and is relatively rigid. Therefore, the walls of the air receiver 28 can be made thin-walled and thus cost-effectively with a saving of material and weight.

The clamps 58 allow the air receiver 28 to be assembled to the heat exchanger 24, so that the cooling unit 12 can be fully assembled before mounting on the radiator 16.

It will be appreciated that the cooling unit 12 as a whole can be attached to the radiator 16, for example, by means of the fastening devices 88. Therefore, separate mounting brackets for the heat exchanger 24 and the air receiver 28 can be omitted, which otherwise may be necessary for fastening.

With the fastening devices 88 molded on the air receiver 28, it should be appreciated that the cooling unit 12 can be connected without significant spacing on one side of the radiator 16, for example, on the bottom of the radiator 16.

The cooling unit 12 can therefore be configured as a cost-effective, light, compact and space-saving component that allows for reliable attachment of the heat exchanger 24 to the radiator 16. At the same time, the air receiver 28 is capable of guiding air through the heat exchanger 24 and rearward, for example, for subsequent cooling of additional units of the internal combustion engine or to remove the exhaust air from the engine compartment together with the heat carried in the exhaust air.

What is claimed is:

1. A cooling unit for use with a cooling system of an internal combustion engine, the cooling system including an air-cooled radiator to reject heat from a coolant of the internal combustion engine, the cooling unit comprising:

an air-cooled heat exchanger to reject heat from another medium to an air flow, the heat exchanger including an inlet for the air flow, an outlet for the air flow, and an outer perimeter extending between the inlet and the outlet;

an air receiver connectable to the radiator and surrounding the outer perimeter of the heat exchanger, the air receiver including an inlet end for the air flow, an outlet end for the air flow, and an air duct extending between the inlet end and the outlet end of direct the air flow from the outlet of the heat exchanger to the outlet end of the air receiver, the inlet end and the inlet being substantially coplanar; and at least one releasable clamp extending across the inlet end and engaged with the air receiver to tighten the air receiver against the heat exchanger.

2. The cooling unit of claim 1 wherein the air receiver includes a first wall extending from the inlet end to the outlet end and a second wall extending from the inlet end to the outlet end opposite to the first wall.

3. A cooling unit for use with a cooling system of an internal combustion engine, the cooling system including an air-cooled radiator to reject heat from a coolant of the internal combustion engine, the cooling unit comprising:

an air-cooled heat exchanger to reject heat from another medium to an air flow, the heat exchanger including an inlet for the air flow, an outlet for the air flow, and an outer perimeter extending between the inlet and the outlet;

an air receiver connectable to the radiator and surrounding the outer perimeter of the heat exchanger, the air receiver including an inlet end for the air flow, an outlet end for the air flow, a first wall extending from the inlet end to the outlet end, a second wall extending from the inlet end to the outlet end opposite to the first wall, and an air duct extending between the inlet end and the outlet end of direct the air flow from the outlet of the heat exchanger to the outlet end of the air receiver, the inlet end and the inlet being substantially coplanar, a part of one of the first and second walls proximate to the outlet end being angled toward the other wall to direct the air flow; and at least one releasable clamp engaged with the air receiver to tighten the air receiver against the heat exchanger.

4. The cooling unit of claim 2 wherein the air receiver further comprises a plurality of spaced support ribs on an exterior side of at least one of the first and second walls, each rib extending from the inlet end toward the outlet end.

5. A cooling unit for use with a cooling system of an internal combustion engine, the cooling system including an air-cooled radiator to reject heat from a coolant of the internal combustion engine, the cooling unit comprising:

an air-cooled heat exchanger to reject heat from another medium to an air flow, the heat exchanger including an inlet for the air flow, an outlet for the air flow, and an outer perimeter extending between the inlet and the outlet;

an air receiver connectable to the radiator and surrounding the outer perimeter of the heat exchanger, the air receiver including an inlet end for the air flow, an outlet end for the air flow, a first wall extending from the inlet end to the outlet end, a second wall extending from the inlet end to the outlet end opposite to the first wall, a plurality of spaced support ribs connecting the first wall to the second wall, the ribs extending between the outlet of the heat exchanger and the outlet end of the air receiver, and an air duct extending between the inlet end and the outlet end to direct the air flow from the outlet of the heat exchanger to the outlet end of the air receiver, the inlet end and the inlet being substantially coplanar at least one releasable clamp engaged with the air receiver to tighten the air receiver against the heat exchanger.

6. The cooling unit of claim 1 wherein the air receiver further comprises a guide vane extending forward from the air receiver at the inlet end to direct the air flow into the inlet of the heat exchanger.

7. The cooling unit of claim 1 wherein the air receiver is a unitary molded component.

8. The cooling unit of claim 1 wherein the air receiver is a molded plastic.

9. A cooling unit for use with a cooling system of an internal combustion engine, the cooling system including an air-cooled radiator to reject heat from a coolant of the internal combustion engine, the cooling unit comprising:

an air-cooled heat exchanger to reject heat from another medium to an air flow, the heat exchanger including an inlet for the air flow, an outlet for the air flow, and an outer perimeter extending between the inlet and the outlet;

an air receiver connectable to the radiator and surrounding the outer perimeter of the heat exchanger, the air receiver including an inlet end for the air flow, an outlet end for the air flow, a first wall extending from the inlet end to the outlet end, a second wall extending from the inlet end to the outlet end opposite to the first wall, and an air duct extending between the inlet end and the outlet end of direct the air flow from the outlet of the heat exchanger to the outlet end of the air receiver, the inlet end and the inlet being substantially coplanar; and at least one releasable clamp and engaged with the air receiver to tighten the air receiver against the heat exchanger, the clamp comprising a tension member including:

a first end engaged with the first wall proximate to the inlet end;

a second end engaged with the second wall proximate to the inlet end; and an elongated part extending from the first end to the second end.

10. The cooling unit of claim 9 wherein
the first end of the tension member includes a bracket having an opening and extending from the elongated part to rest on the first wall; and
the air receiver includes a catch extending away from the first wall proximate to the inlet end, the catch engaged in the opening of the bracket.

11. The cooling unit of claim 10 wherein the catch further includes a stop extending from the catch overlying the bracket to restrict movement of the bracket away from the first wall.

12. The cooling unit of claim 9 wherein
the second end of the tension member includes a foot part connected with the elongated part; and
the air receiver includes a socket on the second wall proximate to the inlet end, the foot part engaged in the socket to restrict torsional movement of the foot part relative to the air receiver.

13. The cooling unit of claim 12 wherein the foot part and the socket have mating polygonal shapes.

14. The cooling unit of claim 12 wherein the clamp further includes a tightening member extending through the socket and engaged with the tension member to tighten the first wall and the second wall against the heat exchanger.

15. The cooling unit of claim 9 wherein
the inlet of the heat exchanger is spaced from the outlet of the heat exchanger by a width of the heat exchanger; and
each of the first and second walls includes a shoulder spaced inward from the inlet end of the air receiver by a distance that approximates the width of the heat exchanger, the elongated part of the tension member abutted against the inlet of the heat exchanger to retain the heat exchanger against the shoulders of the first and second walls.

16. The cooling unit of claim 1 further comprises at least one releasable fastener engaged with the air receiver to fasten the air receiver to the radiator.

17. A cooling unit for use with a cooling system of an internal combustion engine, the cooling system including an air-cooled radiator to reject heat from a coolant of the internal combustion engine, the cooling unit comprising:
an air-cooled heat exchanger to reject heat from another medium to an air flow, the heat exchanger including an inlet for the air flow, an outlet for the air flow, and an outer perimeter extending between the inlet and the outlet;
an air receiver connectable to the radiator and surrounding the outer perimeter of the heat exchanger, the air receiver including an inlet end for the air flow, an outlet end for the air flow, and an air duct extending between the inlet end and the outlet end of direct the air flow from the outlet of the heat exchanger to the outlet end of the air receiver, the inlet end and the inlet being substantially coplanar;
at least one releasable clamp and engaged with the air receiver to tighten the air receiver against the heat exchanger;
at least one releasable fastener engaged with the air receiver to fasten the air receiver to the radiator; and
a hook extending from the air receiver and spaced from the fastener, the hook adapted to be received in an opening of the radiator.

18. A cooling unit for use with a cooling system of an internal combustion engine, the cooling system including a first air-cooled heat exchanger to reject heat from a first medium, the cooling unit comprising:
a second air-cooled heat exchanger to reject heat from another medium to an air flow, the second heat exchanger including an inlet for the air flow, an outlet for the air flow, and an outer perimeter extending between the inlet and the outlet;
an air receiver connectable to the first air-cooled heat exchanger and surrounding the outer perimeter of the second heat exchanger, the air receiver including an inlet end for the air flow, an outlet end for the air flow, and an air duct extending between the inlet end and the outlet end to direct the air flow from the outlet of the second heat exchanger to the outlet end of the air receiver, the inlet end and the inlet being substantially coplanar; and
at least one releasable clamp extending across the inlet end and engaged with the air receiver to tighten the air receiver against the second heat exchanger.

19. A cooling unit for use with a cooling system of an internal combustion engine, the cooling system including a first air-cooled heat exchanger to reject heat from a first medium, the cooling unit comprising:
a second air-cooled heat exchanger to reject heat from another medium to an air flow, the second heat exchanger including an inlet for the air flow, an outlet for the air flow, and an outer perimeter extending between the inlet and the outlet;
an air receiver connectable to the first air-cooled heat exchanger and surrounding the outer perimeter of the second heat exchanger, the air receiver including an inlet end for the air flow, an outlet end for the air flow, a first wall extending from the inlet end to the outlet end, a second wall extending from the inlet end to the outlet end opposite to the first wall; and an air duct extending between the inlet end and the outlet end to direct the air flow from the outlet of the second heat exchanger to the outlet end of the air receiver, the inlet end and the inlet being substantially coplanar;
at least one releasable clamp engaged with the air receiver to tighten the air receiver against the second heat exchanger, the clamp comprising a tension member including a first end engagement the first wall proximate to the inlet end, a second end engaged with the second wall proximate to the inlet end, and an elongated part extended from the first end to the second end.

20. The cooling unit of claim 19 wherein
the first end of the tension member, includes a bracket having an opening and extending from the elongated part to rest on the first wall; and
the air receiver includes a catch extending away from the first wall proximate to the inlet end, the catch engaged in the opening of the bracket.

21. The cooling unit of claim 19 wherein
the second end of the tension member includes a foot part connected with the elongated part; and
the air receiver includes a socket on the second wall proximate to the inlet end, the foot part engaged in the socket to restrict torsional movement of the foot part relative to the air receiver.

22. The cooling unit of claim 21 wherein the clamp further includes a tightening member extending through the socket and engaged with the tension member to tighten the first wall and the second wall against the second heat exchanger.

23. The cooling unit of claim 19 wherein
the inlet of the second heat exchanger is spaced from the outlet of the second heat exchanger by a width of the second heat exchanger; and
each of the first and second walls includes a shoulder spaced inward from the inlet end of the air receiver by a distance that approximates the width of the second heat exchanger, the elongated part of the tension member abutted against the inlet of the second heat exchanger to retain the second heat exchanger against the shoulders of the first and second walls.

24. A cooling unit for use with a cooling system of an internal combustion engine, the cooling system including an air-cooled radiator to reject heat from a coolant of the internal combustion engine, the cooling unit comprising:
an air-cooled heat exchanger to reject heat from another medium to an air flow, the heat exchanger including an inlet for the air flow, an outlet for the air flow, and an outer perimeter extending between the inlet and the outlet, the inlet spaced from the outlet by a width of the heat exchanger;
an air receiver connectable to the radiator and surrounding the outer perimeter of the heat exchanger, the air receiver including
an inlet end for the air flow;
an outlet end for the air flow the inlet end and the inlet being substantially coplanar,
an air duct including a first wall extending from the inlet end to the outlet end, and a second wall extending from the inlet end to the outlet end opposite to the first wall, a part of one of the first and second walls proximate to the outlet end angled toward the other wall to direct the air flow, each of the first and second walls including a shoulder spaced inward from the inlet end by a distance that approximates the width of the heat exchanger;
a plurality of spaced first support ribs on an exterior side of at least one of the first and second walls, each of the first support ribs extending from the inlet end toward the outlet end; and
a plurality of spaced second support rids connecting the first wall to the second wall, the second support ribs extending between the outlet of the heat exchanger and the outlet end of the air receiver; and
at least one releasable clamp engaged with the air receiver to tighten the air receiver against the heat exchanger, the clamp including a first end engaged with the first wall proximate to the inlet end, a second end engaged with the second wall proximate to the inlet end, and an elongated part, the elongated part abutted against the inlet of the heat exchanger to retain the heat exchanger against the shoulders of the first and second walls.

* * * * *

UNITED STATES PATENT AND TRADEMARK OFFICE
CERTIFICATE OF CORRECTION

PATENT NO.    : 6,543,525 B2
DATED         : June 10, 2001
INVENTOR(S)   : Klaus Kalbacher It is certified that error appears in the above-identified patent and that said Letters Patent is hereby corrected as shown below:

Column 5,
Lines 32 and 57, after "the outlet end", "of" has been deleted, and -- to -- has been inserted.

Column 6,
Line 51, after "the outlet end", "of" has been deleted, and -- to -- has been inserted.

Column 7,
Line 52, after "the outlet end", "of" has been deleted, and -- to -- has been inserted.

Signed and Sealed this

Thirtieth Day of September, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,543,525 B2  Page 1 of 1
DATED : April 8, 2003
INVENTOR(S) : Klaus Kalbacher It is certified that error appears in the above-identified patent and that said Letters Patent is hereby corrected as shown below:

Column 5,
Line 59, after "the outlet end", "of" has been deleted, and -- to -- has been inserted.

Column 6,
Line 54, after "the outlet end", "of" has been deleted, and -- to -- has been inserted.

Signed and Sealed this

Twenty-seventh Day of January, 2004

JON W. DUDAS
*Acting Director of the United States Patent and Trademark Office*